United States Patent
Brady et al.

(10) Patent No.: US 7,380,602 B2
(45) Date of Patent: Jun. 3, 2008

(54) COMPOSITION AND METHOD FOR TREATING A SUBTERRANEAN FORMATION

(75) Inventors: Mark Brady, Doha (QA); Arthur Milne, Caracas (VE)

(73) Assignee: Schlumberger Technology Corporation, Sugar Land, TX (US)

( * ) Notice: Subject to any disclaimer, the term of this patent is extended or adjusted under 35 U.S.C. 154(b) by 182 days.

(21) Appl. No.: 10/991,715

(22) Filed: Nov. 18, 2004

(65) Prior Publication Data

US 2006/0102349 A1    May 18, 2006

(51) Int. Cl.
*E21B 43/02*    (2006.01)
(52) U.S. Cl. ...................................... 166/282
(58) Field of Classification Search ...................... None
See application file for complete search history.

(56) References Cited

U.S. PATENT DOCUMENTS

| | | | |
|---|---|---|---|
| 4,888,121 A | 12/1989 | Dill et al. | 252/8.553 |
| 5,979,557 A | 11/1999 | Card et al. | 166/300 |
| 6,258,859 B1 | 7/2001 | Dahayanake et al. | 516/77 |
| 6,399,546 B1 * | 6/2002 | Chang et al. | 507/240 |
| 6,435,277 B1 * | 8/2002 | Qu et al. | 166/281 |
| 6,436,880 B1 | 8/2002 | Frenier | 507/244 |
| 6,569,814 B1 * | 5/2003 | Brady et al. | 507/201 |
| 6,667,280 B2 | 12/2003 | Chang et al. | 507/240 |
| 6,929,070 B2 * | 8/2005 | Fu et al. | 166/308.2 |
| 6,978,838 B2 * | 12/2005 | Parlar et al. | 166/311 |
| 2003/0119680 A1 | 6/2003 | Chang et al. | 507/200 |
| 2003/0134751 A1 | 7/2003 | Lee et al. | 507/200 |

* cited by examiner

*Primary Examiner*—Jennifer H Gay
*Assistant Examiner*—Kerry W Leonard
(74) *Attorney, Agent, or Firm*—Thomas O. Mitchell; David Cate; Robin Nava

(57) ABSTRACT

A method of treating a subterranean formation with a retarded self-diverting fluid system. The method includes contacting the formation with a mixture of acid, chelating agent, and betaine surfactant in which the betaine surfactant is mixed with an aqueous solution of the chelating agent in which the pH has been adjusted to a pH of below about 3.0, but above the pH at which the free acid of the chelating agent precipitates, and the resulting fluid system is utilized for both acid fracturing and matrix stimulation, as well as workover procedures such as scale and filter cake removal, especially in high temperature formations.

30 Claims, 1 Drawing Sheet

COMPOSITION AND METHOD FOR TREATING A SUBTERRANEAN FORMATION

BACKGROUND OF THE INVENTION

The present invention relates to a self-diverting retarded formation-dissolving composition for treating a subterranean formation, particularly at high temperatures. It also relates to methods for acid fracturing and matrix acidizing using the composition.

The flow of fluids through porous media, for example the production of fluids from wells, is governed by three principle factors: the size of the flow path, the permeability of the flow path, and the driving force. It is often necessary to stimulate the production of fluids from subterranean formations when wells are not producing satisfactorily. The failure to produce is typically due to an inadequate, or damaged, path for fluids to flow from the formation to the wellbore. This damage may be because the formation inherently has insufficient porosity and/or permeability, or because the porosity and/or permeability have been decreased (damaged) near the wellbore during drilling and/or completion and/or production.

There are two main stimulation techniques: matrix stimulation and fracturing. Matrix stimulation is accomplished, in sandstones, by injecting a fluid (e.g., acid or solvent) to dissolve and/or disperse materials that impair well production. In carbonate formations, the goal of matrix stimulation is to create new, unimpaired flow channels from the formation to the wellbore. Matrix stimulation, typically called matrix acidizing when the stimulation fluid is an acid, generally is used to treat only the near-wellbore region. In a matrix acidizing treatment, the acid used (for example hydrochloric acid for carbonates) is injected at a pressure low enough to prevent formation fracturing.

When acid is pumped into a subterranean formation, such as a carbonate (limestone or dolomite) formation, at pressures below the fracture pressure, the acid flows preferentially into the highest solubility or the highest permeability regions (that is, largest pores, vugs or natural fractures). Acid reaction in the high-solubility or high-permeability region ideally causes the formation of large, highly conductive flow channels called wormholes that form approximately normal to the fracture. The creation of wormholes is related to the rate of chemical reaction of the acid with the rock. High reaction rates, as observed between typical concentrations of unaltered mineral acids, such as HCl, and carbonates, tend to favor wormhole formation. Acids normally used in field treatments are highly reactive at reservoir conditions and tend to form a limited number of wormholes. A low reaction rate favors the formation of several small-diameter wormholes. It is desirable to take into account well and formation factors (such as temperature and formation composition) and adjust treatment parameters (such as acid strength and injection rate) so that dominant "wormholes" are formed which penetrate through the near wellbore area. However, unless the treatment is designed properly, wormholes are not formed. Instead, for example if the acid flux is too low, the acid reacts evenly with the formation, which is commonly called compact dissolution, dissolving all the rock near the wellbore and not penetrating deep into the formation and creating flow paths there.

In fracturing, on the other hand, a fluid is forced into the formation at a pressure above that at which the formation rock will part. This forcing creates a greatly enlarged flow path. However, when the pressure is released, the fracture typically closes and the new flow path is not maintained unless the operator provides some mechanism by which the fracture is held open. There are two common ways of holding the fracture open. In conventional propped hydraulic fracturing, the fluid that is used to generate or propagate the fracture is viscous and carries a solid proppant that is trapped in the fracture when the pressure is released, preventing the fracture from closing. In acid fracturing, also known as fracture acidizing, the fracture is generated or subsequently treated with an acid. In this case, however, the treatment parameters have in the past been adjusted so that wormholing did not occur. Instead, the object previously has been to etch the faces of the fracture differentially. Then, when the pressure is released, the fracture does not close completely because the differential etching has created an asperity between the faces so that they no longer match up and there are gaps where material has been removed. Ideally the differential etching forms flow channels, usually generally running along the faces of the fracture from the wellbore to the tip, that enhance production.

At present, matrix acidizing treatments are plagued by at least three serious limitations: (1) inadequate radial penetration; (2) incomplete axial distribution; and (3) corrosion of the pumping and well bore tubing. Although the following discussion will focus for the most part on matrix acidizing, similar problems affect acid fracturing methods such that the discussion is entirely applicable to both types of acid treatment.

The first problem with acid treatment, inadequate radial penetration, is caused by the reaction between the acid introduced into the formation and the material in the wellbore and/or formation matrix, with which it first contacts. The material and/or formation first contacted by the acid is usually at or near the wellbore such that the formation near the wellbore is adequately treated and portions of the formation more distal to the wellbore (as one moves radially, outward from the wellbore) remain untouched by the acid, since all of the acid reacts before it can get there. In fact, dissolution of the material and/or formation encountered by the acid may be so effective that the injected acid is essentially spent by the time it reaches a few inches beyond the wellbore.

A second problem that limits the effectiveness of matrix acidizing technology is incomplete axial distribution. This problem relates to the proper placement of the acid-containing fluid, i.e., ensuring that the fluid is delivered to the desired zone or zones (i.e., the zone that needs stimulation) rather than another zone or zones. More particularly, when a formation is injected with acid, the acid begins to dissolve the most reactive or first-contacted material in the wellbore and/or the matrix. Depending upon the reactivity of the acid with the matrix and the flow rate of acid to the reaction location, as one continues to pump acid into the formation, a dominant channel through the matrix is often created. As one continues to pump acid into the formation, the acid flows along that newly created channel as the path of least resistance and therefore leaves the rest of the formation substantially untreated. This behavior is exacerbated by intrinsic permeability heterogeneity (common in many formations), especially the presence of natural fractures and high permeability streaks in the formation. Again, these regions of heterogeneity in essence attract large amounts of the injected acid, hence keeping the acid from reaching other parts of the formation along the wellbore where it is actually desired most. Thus, in many cases, a substantial fraction of the productive, hydrocarbon-bearing intervals within the zone to be treated are not contacted by enough acid to penetrate deep enough (laterally in the case of a vertical wellbore) into the formation matrix effectively to increase its permeability and therefore its capacity for delivering hydrocarbon to the wellbore. This problem of proper placement is particularly vexing since the injected fluid preferentially migrates to higher permeability zones (the path of least resistance) rather than to lower permeability zones, yet it is those latter zones that require the acid treatment (i.e., because they are low permeability zones, the flow of hydrocarbon through them is diminished). In response to this problem, numerous techniques have evolved to achieve more controlled placement of the fluid, diverting the acid away from naturally high permeability zones, and zones already treated, to the regions of interest.

Techniques to control acid placement (i.e., to ensure effective zonal coverage) can be roughly divided into either mechanical or chemical techniques. Mechanical techniques include ball sealers (balls dropped into the wellbore that plug the perforations in the well casing, thus sealing the perforation against fluid entry), packers (particularly straddle packers that plug a portion of the wellbore and thereby inhibit fluid entry into the perforations around that portion of the wellbore) and bridge plugs, coiled tubing (flexible tubing deployed by a mechanized reel, through which the acid can be delivered with more precise location within the wellbore), and bullheading (attempting to achieve diversion by pumping the acid at the highest possible pressure—just below the pressure that would actually fracture the formation). Chemical techniques can be further divided into techniques that chemically modify the wellbore adjacent the portions of the formation for which acid diversion is desired, and techniques that modify the acid-containing fluid itself. The first type involves, for example, particulate materials that form a reduced-permeability cake on the wellbore face that, upon contact with the acid, diverts the acid to higher permeability regions. These materials are typically either oil-soluble or water-soluble particulates that are directed at the high permeability zones to plug them and therefore divert acid flow to the low permeability zones. The second type includes foaming agents, emulsifying agents, and gelling agents. Mechanical methods and chemical methods that chemically modify the wellbore adjacent portions of the formation for which acid diversion is desired will not be considered further here.

Emulsified acid systems and foamed systems are commercially available responses to the diversion problem, but operational complexity sometimes limits their use. For instance, flow rates of two fluids and bottom hole pressure must be meticulously monitored during treatment. Gelling agents are commercially available, but are often undesirable in matrix acidizing since the increased viscosity makes the fluid more difficult to pump (i.e., the same resistance to flow that confers the pressure build-up in the formation and results in the desired diversion, actually makes these fluids difficult to place). Some commercially available systems are polymeric cross-linked systems, i.e., they are linear polymers when pumped, but a chemical agent pumped along with the polymer causes the polymers to aggregate or cross-link once in the wellbore, which results in gelling. Unfortunately, these systems leave a residue in the formation, which can damage the formation, resulting in diminished hydrocarbon production. In addition, the success of these systems is naturally dependent upon a cross-linking reaction that can be difficult to optimize so that it is delayed during pumping but maximized once the chemicals are in the bottom or end of the wellbore, or in the formation. This reaction is easily perturbed by formation chemistry, contaminants in the pumping equipment, and other factors.

Viscoelastic surfactant based gelling systems can avoid these problems. One viscoelastic surfactant based gelling system is disclosed in U.S. Pat. Nos. 5,979,557 and 6,435,277, which have a common Assignee as the present application. Another viscoelastic surfactant based gelling system is disclosed in U.S. Pat. No. 6,399,546 and U.S. patent application Ser. No. 10/065,144, which also have a common Assignee as the present application. Viscoelastic diverting acids (VDA's) were developed for carbonate matrix acidizing and may contain certain zwitterionic surfactants, such as those based on betaines (described in U.S. Pat. No. 6,258,859 and referred to as BET surfactants), an acid, and (for some BET surfactants) a co-surfactant or (for some BET surfactants) an alcohol. The initially injected fluid has a nearly water-like viscosity, but after a considerable portion of the acid is spent, or consumed, in a carbonate formation that reacts with a large amount of acid, viscosity increases substantially. Thus, when first injected, VDA's enter the most permeable zone(s), but when they gel, they block that zone or zones and divert subsequently injected fluid into previously less-permeable zones. The success of such systems depends upon the ability of the formation to react with a large amount of acid. Consequently, they are most useful with carbonates that have a large capacity to react with acid.

Another limitation of acid treatments is the corrosion of the pumping equipment and well tubing and casing caused by contact with the acid (made worse by the use of concentrated solutions of mineral acids). To solve the corrosion problem, conventional acid treatments often add a corrosion inhibitor to the fluid. However, corrosion inhibitors can significantly increase the cost of acidizing treatments.

Another problem with acid treatments is iron precipitation, especially in sour wells (i.e., wells in which the hydrocarbon has a relatively high sulfur content) or carbonate formations. There is a tendency for iron sulfide scale to form in boreholes and/or formations, especially in sour wells. The acid used to treat the well can dissolve the iron sulfide, but in the process hydrogen sulfide is generated, which is toxic and stimulates corrosion. In addition, the dissolved iron tends to precipitate, in the form of ferric hydroxide or ferric sulfide, as the acid in the treatment fluid becomes spent and the pH of the fluid increases. Precipitation of iron is highly undesirable because of damage to the permeability of the formation. Therefore, acid treatment fluids often contain additives to minimize iron precipitation and evolution of hydrogen sulfide, for example, by sequestering the iron ions in solution using chelating agents such as ethylenediaminetetraacetic acid (EDTA).

U.S. Pat. No. 4,888,121 discloses an acidizing composition that includes an acid such as HCl; an iron sequestering agent such as citric acid, EDTA, or nitrilotriacetic acid (NTA); and a sulfide modifier such as formaldehyde. This composition is stated to inhibit precipitation of ferric hydroxide, ferrous sulfide, and free sulfur during the well acidizing treatment. Although the treatment fluid described in that patent can help control iron precipitation, in some situations effective control requires the use of so much material that the treatment cost becomes excessive; this is especially true for treatment fluids comprising EDTA, which has relatively low solubility in acid (e.g., pH≦4).

Another limitation of known acid treatments is their susceptibility to the temperature of the subterranean formation. The effects of high formation temperatures, for instance, vary widely according to the details of the particular fluid treatment. In some acid treatments, the high temperature has a tendency to accelerate corrosion of metal in the wellbore. In other fluids, the intended viscosity changes to do not occur such that the acid does not serve the intended purpose of propping and/or diverting.

SUMMARY OF THE INVENTION

It is an object of the present invention to provide a stimulation method that uses a fluid system that is a thermally stable, self-diverting, retarded, and gives low friction pressures. The retardation that is required at high temperatures and to control placement and permeability is provided by a chelant system that has advantages over most other, widely used retardation methods using emulsified acids. A viscoelastic surfactant that gels as stimulation proceeds is added to facilitate leak off control, diversion, and drag reduction, all of which are features that are advantageous over emulsified acid systems where a separate diverting system must be pumped (for example polymer gel, polymer in acid, or viscoelastic surfactant in acid). The fluid system does not employ mineral acid to react with the formation because any acid added to the formulation to adjust the pH does not persist once it is added to the chelant because the acid is consumed in partially neutralizing the alkaline chelant; thus sludging is much less likely compared to prior acid fluids. The methods of the invention include acid fracturing, acidizing, diversion, filter cake removal and scale removal.

In one aspect, these objects are achieved by providing a method for treating a subterranean carbonate formation comprising the steps of reducing the pH of an aqueous solution of a chelating agent with an acid to a pH of less than about 3, and above the pH value at which the free acid form of the chelating agent precipitates, to make a low pH solution of chelating agent, and mixing a BET surfactant with the low pH chelating agent solution. A subterranean carbonate formation is then contacted with the mixture of BET surfactant and low pH solution of chelating agent.

In another aspect, the present invention also provides an improved method for acid treatment of a high temperature subterranean carbonate formation wherein the improvement comprises contacting the subterranean carbonate formation with a mixture of a BET surfactant and a low pH main phase in which the low pH main phase is prepared by reducing the pH of an aqueous solution of a chelating agent with an acid to a pH of less than about 3, and above the pH value at which the free acid form of the chelating agent precipitates.

It is also an object of the present invention to provide a method for effective treatment of a subterranean formation, particularly a carbonate formation, at temperatures of about 170° F. (77° C.) and higher for stimulating production of hydrocarbons from a well.

It is another embodiment of the present invention to remove barium carbonate and/or barium sulfate scale from the well in high temperature environments Another object of the present invention is to provide a one-step method for high temperature carbonate matrix and fracture acidizing for both leak-off control and kinetic retardation.

Yet another object of the present invention is to provide a method for achieving long etched fracture half lengths with a retarded acid system that is not hampered by high friction pressure/drag.

Yet another object of the present invention is to provide a method for matrix and fracture acidizing in a system that can be loaded up with NaBr brine for acidizing with a high density fluid in the tight zones of carbonate formations.

Yet another object of the present invention is to provide a method for attaining breakdown, propagation, and long etched fracture lengths under conditions where surface pressures are high.

Still another object of the present invention is to provide a method for removing filter cake while controlling excessive leak-off in situations in which the filter cake is compromised as a result of erosion that occurs faster than expected.

This listing of some of the objects of the present invention is not intended to be all-inclusive. Other objects, and the advantages, of the present invention will be made clear to those skilled in the art by the following description of the presently preferred embodiments thereof.

DETAILED DESCRIPTION OF THE INVENTION

Figure 1:
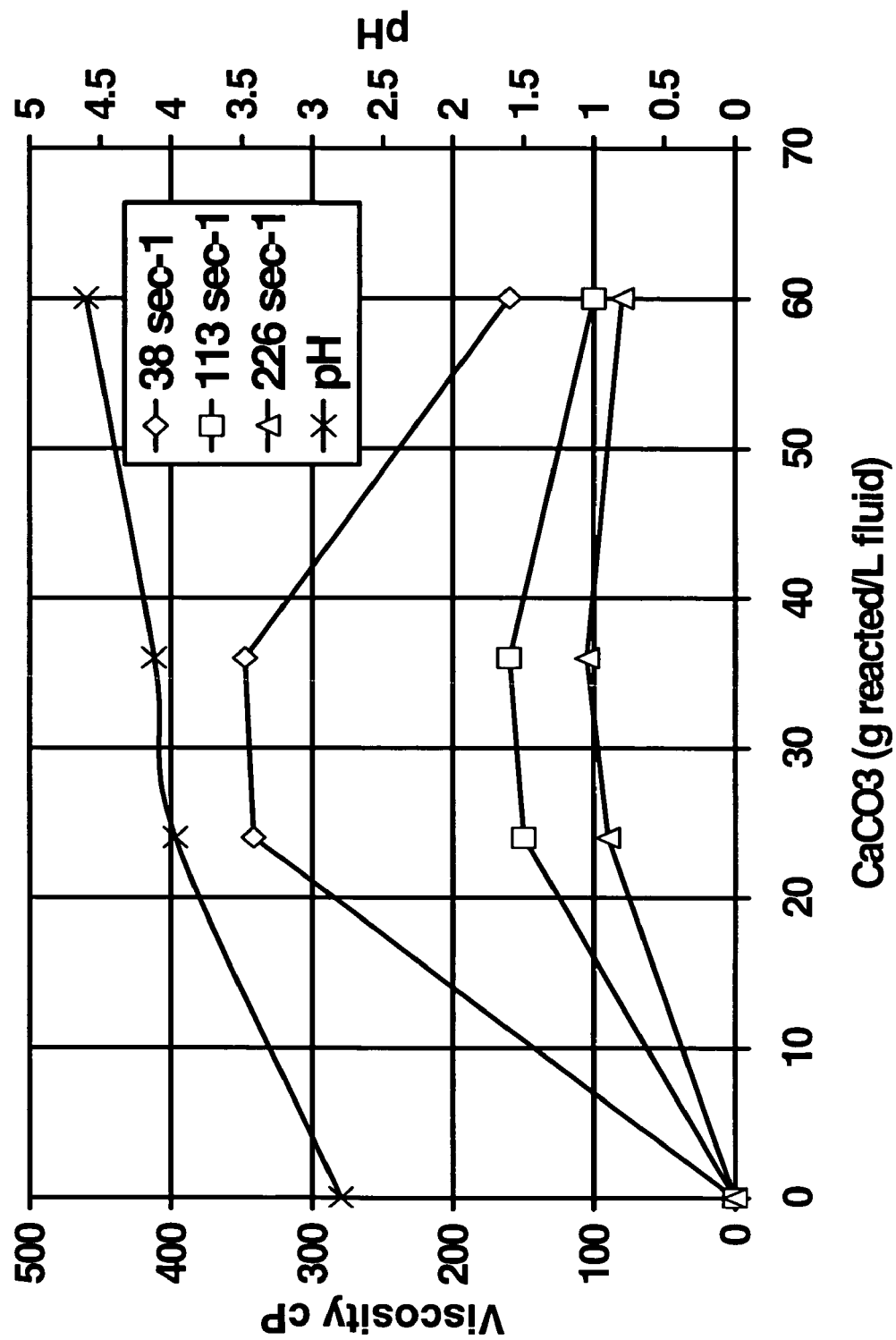
FIG. 1 is a graph showing the change in viscosity of a treatment fluid for use in connection with a preferred embodiment of the method of the present invention as a function of the amount of calcium carbonate reacted.

In accordance with one embodiment of the method of the present invention, a fluid system is provided for contacting a subterranean formation in which temperatures may exceed about 170° F. (77° C.) and may reach as high as about 450° F. (220° C.). The treatment fluid includes a viscoelastic surfactant fluid system (a VES) and a chelating agent in an aqueous solution; the pH in the aqueous main phase is adjusted to below about 3.0, and preferably to a pH of about 2.8, with a mineral acid. The pH is kept above the pH at which the free acid of the chelating agent would precipitate; this generally means keeping the pH above about 1. Depending upon conditions in the particular wellbore or formation in which the method is to be conducted, it may also be advantageous to include an alcohol (such as methanol, for instance, to aid clean-up) and/or a non-emulsifier in the fluid system. As is known in the art, a corrosion inhibitor may also be included in the fluid system, but the proportion of corrosion inhibitor is generally lower than in conventional acid treatment fluids.

Procedures for pumping fluids down the wellbore in accordance with the method of the present invention to stimulate a subterranean formation are well known. The person that designs such treatments is the person of ordinary skill to whom this disclosure is directed. That person has many tools available to help design and implement matrix stimulation and acid fracturing treatments, one of which is a computer program commonly referred to as a fracture simulation model (also known as fracture models, fracture simulators, and fracture placement models). Most commercial service companies that provide stimulation services to the oilfield offer one or more such simulation models; for instance, one commercial fracture simulation model that is used to advantage in connection with the method of the present invention is known as FracCADE®. This commercial computer program is a fracture design, prediction, and treatment-monitoring program available from Schlumberger. As far as is known, the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, John Wiley & Sons (2000), is an excellent reference book for fracturing and other well treatments; it discusses fracture simulation models in Chapter 5 (pages 5-28) and the Appendix for Chapter 5 (page A-15).

The fluid used in the present method is sometimes called a self-diverting wormholing acid fluid system or a self-diverting retarded acid fluid system; although the fluid is live and reactive, it is not a strong acid, so the word acid may be left out of the phrase. In certain embodiments when the method of the present invention is used in connection with fracturing a formation, because the fracture area available for inflow of fluids into the wellbore is increased by the creation of wormholes, it is not necessary to generate a long fracture in the formation. Many of the fluid systems of the present invention have the added advantage of being breakers for polymers, or for some of the surfactants and/or the micelles in VES's. Another advantage to the method of the present invention is that the operator is able to push live formation-dissolving fluid out further and more quickly because some of the volume of the fracture is already taken up by proppant. Another advantage is that the operator is able to pump into a propped fracture at much lower pressures, which is an economic advantage. This would also allow formation-dissolution to be accomplished at the optimal flow rate for wormholing in the desired location rather than at a flow rate dictated by the need to keep the fracture open.

Turning now to the composition of the acid treatment fluid for use in connection with the method of the present invention, the chelating agents useful herein are a known class of materials having many members. The class of chelating agents includes, for example, aminopolycarboxylic acids and phosphonic acids and sodium, potassium and ammonium salts thereof. HEDTA and HEIDA (hydroxyethyliminodiacetic acid) are particularly useful in the present process; the free acids and their $Na^+$, $K^+$, $NH_4^+$, and $Ca^{++}$ salts are soluble in strong acid as well as at high pH so they may be more readily used at any pH and in combination with any other reactive fluids (e.g., HCl). Other aminopolycarboxylic acid members, including EDTA, NTA (nitrilotriacetic acid), DTPA (diethylenetriamine-pentaacetic acid), and CDTA (cyclohexylenediaminetetraacetic acid) are also suitable. At low pH, these latter acids and their salts may be less soluble. Phosphonic acids and their salts, including ATMP (aminotri-(methylenephosphonic acid)), HEDP (1-hydroxyethylidene-1,1-phosphonic acid), HDTMPA (hexamethylenediamine-tetra-(methylenephosphonic acid)), DTPMPA (diethylenediaminepenta-(methylenephosphonic acid)), and 2-phosphonobutane-1,2,4-tricarboxylic acid are further examples of materials that function as chelating agents that are suitable for use in connection with the method of the present invention. These phosphonic acids are available from Solutia, Inc., St. Louis, Mo. (USA) as DEQUEST® phosphonates. Such materials are known in the oilfield. Prior treatments did not, however, inject such fluids into a high temperature formation in such a manner as to maintain optimum wormhole-forming efficiency, nor were they as effective as the methods of the present invention in creating wormholes in the formation extending out from the fracture faces. Particularly preferred chelant-based dissolvers are those containing hydroxyethylaminocarboxylic acids such as hydroxyethylethylenediaminetriacetic acid (HEDTA), hydroxyethyliminodiacetic acid (HEIDA), or a mixture thereof, as described in U.S. Pat. No. 6,436,880, which has a common Assignee as the present application, and which is hereby incorporated into this specification in its entirety by this reference thereto. The most preferred chelant-based dissolver contains HEDTA (sodium, potassium, and/or ammonium salts) as the only chelant. Fluid systems containing such chelants may be viscosified and exhibit a further increase in viscosity upon spending with the formation.

Particularly preferred self-diverting wormholing acid fluid systems used in the invention are those made from solutions of certain surfactants, particularly certain betaines, optionally in conjunction with co-surfactants or lower alcohols. Examples are described in U.S. Pat. Nos. 6,399,546 and 6,667,280, and U.S. Patent Application Publication No. 2003-0119680, all of which have a common Assignee as the present application, and all of which are hereby incorporated herein in their entirety by these specific references thereto. A preferred fluid system of the invention is made from erucic amidopropyl dimethyl betaine (also known as erucylamidopropyl betaine), and a highly-preferred system is made from oleylamidopropyl dimethyl betaine. These self-diverting wormholing acid fluid systems have the important property that they have water-like viscosities as formulated (when the pH is below about 3) but their viscosities increase dramatically as pH is increased above a value of about 3 as they react with the carbonate in the subterranean formation.

Preferred surfactants are betaines. Two suitable examples of betaines are BET-O and BET-E; most preferred is BET-O-30. The surfactant in BET-O-30 is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. The surfactants are supplied in this form, with an alcohol and a glycol, to aid in solubilizing the surfactant in water at high concentration, and to maintain it as a homogeneous fluid at low temperatures. However, the surfactants could be obtained and used in other forms. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. One chemical name for the surfactant in BET-E-40 is erucylamidopropyl betaine. As-received concentrates of BET-E-40 were used in the experiments reported below. BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; the inorganic salts may be present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS). Other suitable co-surfactants for BET-O-30 are certain chelating agents such as trisodium hydroxyethylethylenediamine triacetate.

These betaine surfactants can form aqueous viscous high-temperature gels in any electrolyte concentration; they form gels with no added salt or even in heavy brines. The fluids can generally be prepared, for example, with municipal water, lake or creek water, or seawater. For a given surfactant and conditions (especially the temperature and the time for which a suitable viscosity is required) the salinity and the presence and nature of the co-surfactants and other optional additives can be adjusted in accordance with parameters known to those skilled in the art to ensure that the gel will have the desired stability. Any corrosion inhibitors (and the solvents for such corrosion inhibitors) utilized in such fluid systems also slow rehealing (the recovery of the gel after high shear perturbation). Fluid systems utilized in the method of the present invention have the advantage of requiring a lower concentration of corrosion inhibitor than is required for strong acids at high temperature.

The acid used to neutralize the chelating agent can be any inorganic acid; by non-limiting example, hydrochloric, sulfuric, or nitric acid. The rheology is affected primarily by the acid strength, not by the type of anion.

The acid may optionally be an organic acid (or may include an organic acid) that is preferably formic acid, acetic acid, or citric acid. Other acids such as boric acid, lactic acid, methyl sulfonic acid, and ethyl sulfonic acid may be used, although the gels formed using formic acid, acetic acid, or citric acid are more stable.

The optional alcohol utilized in fluid systems that are utilized in the method of the present invention is preferably methanol, but ethanol, propanol, isopropanol, ethylene glycol and propylene glycol may be used for lower temperature applications. One purpose of the alcohol is to prevent the formation of sludge when the temperature is low and one of the surfactant decomposition products is a high-melting fatty acid such as a $C_{22}$ fatty acid that could be a solid. The amount of alcohol needed depends upon the temperature and the chemical structure of the hydrophobic tail of any fatty acids formed. For example, above about 93° C., typically only about 1% methanol is required to prevent sludge formation from the BET surfactants.

As is usually the rule for acid treatments, formulations for use in connection with the method of the present invention will typically comprise corrosion inhibitors, most preferably small amounts of corrosion inhibitors based on quaternary amines, for example at a concentration of from about 0.2 weight percent to about 1.5%, preferably about 0.4 to about 1.0%, and most preferably from about 0.2% to about 0.6%. Formic acid can also be used as a corrosion inhibitor, typically at a concentration of from about 0.1 to about 2.0 weight percent. All other additives normally used in oilfield treatment fluids, such as, but not limited to, corrosion inhibitor aids, scale inhibitors, biocides, leak-off control agents, shale stabilizing agents such as ammonium chloride, tetramethyl ammonium chloride, or cationic polymers, monovalent and polyvalent salts, polyelectrolytes, other surfactants, buffers, non-emulsifiers, freezing point depressants, iron-reducing agents, chelating agents for the control of multivalent cations, and others can also be included as needed, provided that they do not disrupt the structure, stability, or subsequent degradability of the surfactant gels.

The surfactant concentration in the fluid systems utilized in the method of the present invention is typically from about 1 to about 6 weight percent (active ingredient); preferred is from about 2 to about 4%; most preferred is about 3%. The amount of surfactant is chosen so that the fluid system builds sufficient viscosity to act effectively as a diverter but degradation of the surfactant will reduce that viscosity after the desired time. The inorganic acid concentration, for example HCl, is from about 6 to about 20 weight percent, preferably from about 6 to about 15%; most preferably about 12%. The organic acid concentration, for example formic acid, is from about 5 to about 20 weight percent, preferably from about 5 to about 10%, most preferably about 6%. The alcohol concentration, for example, methanol, is from about 0 to about 10 weight percent, preferably from about 1 to about 6%, most preferably about 6%.

Except as may be helpful in adjusting the pH of the fluid system, there are no restrictions on the order of addition of the components of the compositions that are utilized in connection with the present invention as they are being made up. The as-received surfactant mixture, water, inorganic acid, and chelating agent, and optional materials such as alcohols, co-surfactants, organic acids, and salt, may be blended in any order either in the field or at a separate location. Optionally, any one or more of the ingredients may be injected into the subterranean formation separately, that is some of the blending may occur in the wellbore or in the formation. Alternatively, any combination of some of the components can be premixed on site or at a separate location and then another component or components may be added later. The fluids may be batch mixed or mixed on the fly. Standard mixing equipment and methods may be used; heating and special agitation are normally not needed but may be used. Heating may be employed under extremely cold ambient conditions. The exact amounts of the component ingredients and the specific surfactant or mixture of surfactants and chelant or mixture of chelants to be used will depend upon the viscosity desired, the temperature of use, the time desired before the viscosity has increased above a predetermined value, and other similar factors.

Similarly, other fluids used in conjunction with the method of the present invention, such as spacers, flushes, and the like, may contain such additives, again provided that they do not interfere with the function of the fluid system. The fluid system in accordance with the method of the present invention may be pumped as the reactive fluid in stages separated by stages of inert gelled (which may or may not be cross-linked polymer) fluid, or separated by stages of formation-dissolving fluid, with or without pre-flush or post-flush, for example in acid fracturing to create the required etched fracture geometry. It is noted, however, that a shut-in time based on the actual bottom temperature may be utilized, for example in acid fracturing, to maximize the effectiveness of the treatment at temperatures below about 200° F. (93° C.). Above that temperature, treatment is performed as for conventional acid treatment.

It is expected that treatment with the fluid system in accordance with the method of the present invention will sometimes be sensitive to iron, especially at high temperature. For that reason, a pre-flush treatment with iron reducing agent and chelating agent may be injected before the fluid system is pumped in some formations and where tubing is expected to have very high rust/dissolvable iron. Although the formulation of the fluid system utilized in connection with the present invention is compatible with small concentrations of non-emulsifying agents, to prevent emulsions and sludge, it may also be advantageous to pre-flush the well with a mutual solvent, preferably low molecular weight esters, ethers or alcohols, and more preferably ethylene glycol monobutyl ether.

The method of the present invention may be better understood by reference to the following examples describing certain preferred embodiments of the method, as well as the results of several tests that have been found to be relevant to predicting the performance of fluid systems in a subterranean formation.

EXAMPLE 1

An initial bench-top, small-scale experiment was performed by preparing a live acid formulation with 20% HEDTA dissolved in water and reduced in pH from about 12 to about 2.8 with HCl. 1% methanol, 0.2 to 0.4% corrosion inhibitor, and 7.5% BET-0-40 were added and agitated in a jar. A light gel was formed with a viscosity of about 100 cP, at 170 sec-1 at room temperature (estimated, as the sample was not large enough to measure). The formulation was spent using two spatula-fulls of powdered calcium hydroxide with mild agitation performed by shaking the jar. After about one minute, no visible signs of additional thickening were observed. However, after 2-3 minutes, a thick fluid that hung on the lip of the jar when the jar was tilted as if to pour out any liquid therein, reminiscent of heavily crosslinked fracturing gels, was produced.

EXAMPLE 2

The second test was a test to determine the feasibility of using the method of the present invention in reservoirs (simulated with crude oil) having a high tendency to generate sludge and/or precipitate asphaltenes in the presence of highly concentrated HCl or organic acid blend. A fluid was prepared starting with aqueous 20% HEDTA reduced to a pH of about 2.8 with hydrochloric acid, 1% methanol, 2.6% corrosion inhibitor, 0.3% non-emulsifier, and 7.5% BET-O-40 in the presence of 1000 ppm $Fe^{+++}$. As shown in FIG. 1, the system gelled in the presence of $CaCO_3$; the change in viscosity was more pronounced at low sheer. The x-axis in FIG. 1 is the grams of $CaCO_3$ reacted per L of this fluid.

EXAMPLE 3

A test was conducted to ascertain the corrosive effect of the fluid system utilized in practicing the method of the present invention as follows. Fluids were prepared with reagent grade chemicals diluted with tap water. One inch by 1.5 inch (2.5 cm×3.8 cm) test coupons of L80 and P110 steels were numbered for identification, cleaned, rinsed in acetone, dried and weighed, and then stored in a desiccator until use. Corrosivity was evaluated in an autoclave at 270° F. (132° C.) with exposure time to six hours at 3000 psi (20.7 MPa). Following the test, the coupons were rinsed in acetone and scrubbed with soap and water to remove inhibitor film and corrosion deposits. A final rinse in acetone was completed prior to re-weighing the metal coupons to calculate corrosion rates. The corrosion rates observed are shown below with a pitting index score by which (a pitting index of 3 or less is considered acceptable) determined by the size and depth of pits as shown in the following table:

| Description of Corrosion | Pitting Index |
|---|---|
| None | 0 |
| Minor edge corrosion | 1 |
| Pitting on edge only | 2 |
| <25 Pin-point pits on surface | 3 |
| >25 Pin-point pits on surface | 4 |

A fluid system was made up with HEDTA, corrosion inhibitor, 1% methanol, 0.3% emulsifier, and 5.0% BET-O. Corrosion inhibition is shown in the following table:

| Steel | Corrosion inhibitor | Corrosion rate | Pitting index |
|---|---|---|---|
| L80 | 12 | 0.0147 | 0 |
| P110 | 12 | 0.0392 | 2 |

Those skilled in the art who have the benefit of this disclosure will recognize that certain changes can be made to the component parts of the apparatus of the present invention without changing the manner in which those parts function to achieve their intended result. All such changes, and others which will be clear to those skilled in the art from this description of the preferred embodiments of the invention, are intended to fall within the scope of the following, non-limiting claims.

What is claimed is:

1. A method of treating a subterranean carbonate formation comprising the steps of:
   a. reducing the pH of an aqueous formation dissolving solution of an alkaline chelating agent with an acid to a pH of less than about 3 and above about 1, and above the pH value at which the free acid form of the chelating agent precipitates, wherein the acid is consumed to partially neutralize the chelating agent;
   b. mixing a betaine surfactant with the low pH solution of chelating agent; and
   c. injecting the solution into a carbonate formation; whereby the acid which reduces the pH of the solution of a chelating agent does not react with the formation.

2. The method of claim 1 additionally comprising adding a non-emulsifier.

3. The method of claim 1 wherein the betaine surfactant is selected from the group consisting of erucylamidopropyl betaine and oleylamidopropyl betaine, and mixtures of such betaine surfactants.

4. The method of claim 3 wherein the betaine surfactant is oleylamidopropyl betaine.

5. The method of claim 1 wherein the chelating agent is HEDTA.

6. The method of claim 1 wherein one or more of the acid, chelating agent, or betaine surfactant is pumped into the subterranean carbonate formation before mixing.

7. The method of claim 6 wherein the acid, chelating agent, and/or betaine surfactant is alternately pumped with a fluid selected from a formation-dissolving fluid and an inert gelled fluid.

8. The method of claim 1 additionally comprising adding an alcohol.

9. The method of claim 1 wherein a portion of the formation is dissolved.

10. The method of claim 9 wherein the formation is fractured.

11. The method of claim 1 wherein scale is dissolved.

12. The method of claim 1 wherein filtercake is dissolved.

13. The method of claim 1 wherein the free acid form of the chelating agent and its $Na^+$, $K^+$, $NH_4^+$, and $Ca^{++}$ salts are soluble at the pH's of the pH reducing, surfactant mixing and injection steps.

14. The method of claim 13 wherein the chelating agent is selected from HEDTA and HEIDA.

15. The method of claim 13 wherein the acid in the pH reduction step comprises an inorganic acid in an amount of from about 6 to about 20 weight percent by weight of the injected solution.

16. In a method for treatment of a subterranean carbonate formation, the improvement comprising injecting into a subterranean carbonate formation a mixture of a betaine surfactant and a low pH formation dissolving solution of a chelating agent in which the low pH solution of chelating agent is prepared by reducing the pH of an aqueous solution of chelating agent with an acid to a pH of less than about 3, and a pH above about 1, and above the pH at which the free acid of the chelating agent precipitates, and wherein the acid which reduces the pH of the solution of a chelating agent is consumed to partially neutralize the chelating agent, whereby the acid does not react with the formation.

17. The method of claim 16 wherein the betaine surfactant is mixed with the aqueous solution of chelating agent before contacting the formation with the mixture.

18. The method of claim 16 additionally comprising adding a non-emulsifier.

19. The method of claim 16 additionally comprising pumping the mixture at a pressure that causes fractures in the subterranean formation.

20. The method of claim 16 wherein the mixture is pumped at a pressure that facilitates radial penetration into the subterranean carbonate formation.

21. The method of claim 16 wherein the bottom temperature of the subterranean formation ranges between about 200° F. and about 450° F.

22. The method of claim 16 additionally comprising utilizing a shut-in time when the bottom temperature of the subterranean carbonate formation is below about 200° F.

23. The method of claim 16 wherein the betaine surfactant is oleylamidopropyl betaine.

24. The method of claim 16 wherein the chelating agent is HEDTA.

25. The method of claim 16 wherein one or more of the acid, chelating agent, or betaine surfactant is pumped into the subterranean carbonate formation before mixing.

26. The method of claim 16 wherein the acid, chelating agent, and/or betaine surfactant is alternately pumped with an inert gelled fluid.

27. The method of claim 16 wherein the acid, chelating agent, and/or betaine surfactant is alternately pumped with a formation-dissolving fluid.

28. The method of claim 16 wherein the free acid form of the chelating agent and any $Na^+$, $K^+$, $NH_4^+$, and $Ca^{++}$ salts thereof are soluble at the pH's of the aqueous chelating agent solution and the low pH formation dissolving solution.

29. The method of claim 28 wherein the chelating agent is selected from HEDTA and HEIDTA.

30. The method of claim 28 wherein the acid for the pH reduction comprises an inorganic acid in an amount of from about 6 to about 20 weight percent by weight of the injected betaine surfactant-low pH formation dissolving solution mixture.

* * * * *